(12) United States Patent
Hellemans

(10) Patent No.: US 11,498,242 B2
(45) Date of Patent: Nov. 15, 2022

(54) PROCESS FOR PROVIDING A FIBER CEMENT PRODUCT

(71) Applicant: Eternit NV, Kapelle-op-den-Bos (BE)

(72) Inventor: Philippe Hellemans, Antwerp (BE)

(73) Assignee: Eternit, NV, Kapelle-op-den-Bos (BE)

( * ) Notice: Subject to any disclaimer, the term of this patent is extended or adjusted under 35 U.S.C. 154(b) by 337 days.

(21) Appl. No.: 15/309,291

(22) PCT Filed: May 26, 2015

(86) PCT No.: PCT/EP2015/061596
§ 371 (c)(1),
(2) Date: Nov. 7, 2016

(87) PCT Pub. No.: WO2015/185392
PCT Pub. Date: Dec. 10, 2015

(65) Prior Publication Data
US 2017/0080598 A1    Mar. 23, 2017

(30) Foreign Application Priority Data

Jun. 3, 2014   (EP) .................................. 14171047
Dec. 5, 2014   (EP) .................................. 14196610

(51) Int. Cl.
*B28B 11/24*   (2006.01)
*B28B 11/08*   (2006.01)
(Continued)

(52) U.S. Cl.
CPC ............ *B28B 11/0818* (2013.01); *B24C 1/06* (2013.01); *B28B 1/527* (2013.01); *B28B 11/245* (2013.01);
(Continued)

(58) Field of Classification Search
CPC ........ C04B 28/02; C04B 41/009; C04B 14/40; C04B 41/4578; C04B 41/45; C04B 41/4572; C04B 14/30; C04B 41/61
See application file for complete search history.

(56) References Cited

U.S. PATENT DOCUMENTS 2,328,058 A    8/1943  Crabbs
3,616,103 A    10/1971 Greiner et al.
(Continued)

FOREIGN PATENT DOCUMENTS

AT   WO 2009021253 A1 *  2/2009  ............... B24C 1/00
BE           2036871 A1 *  3/2009  ............. C04B 28/02
(Continued)

OTHER PUBLICATIONS

Machine translation of DE 102008/020544 A1, obtained from the EPO on Jun. 15, 2017.*
(Continued)

*Primary Examiner* — Monica A Huson
*Assistant Examiner* — Kelsey C Grace
(74) *Attorney, Agent, or Firm* — Dilworth & Barrese, LLP

(57) ABSTRACT

A process for providing a fiber cement product is provided the process comprising the steps of: —providing an uncured fiber cement product; —curing said uncured fiber cement product; —drying said cured fiber cement product to obtain a humidity of said cured fiber cement product being less than or equal to about 8% w; —abrasive blasting at least part of the surface of said dried fiber cement product.

10 Claims, 1 Drawing Sheet

(51) Int. Cl.
| | |
|---|---|
| *B28B 1/52* | (2006.01) |
| *C04B 41/00* | (2006.01) |
| *B24C 1/06* | (2006.01) |
| *C04B 41/72* | (2006.01) |
| *C04B 41/53* | (2006.01) |
| *E04C 2/06* | (2006.01) |
| *C04B 40/00* | (2006.01) |
| *C04B 16/06* | (2006.01) |
| *C04B 28/04* | (2006.01) |
| *E04D 1/16* | (2006.01) |
| *E04F 13/14* | (2006.01) |

(52) U.S. Cl.
CPC .............. *C04B 16/06* (2013.01); *C04B 28/04* (2013.01); *C04B 40/0064* (2013.01); *C04B 41/009* (2013.01); *C04B 41/53* (2013.01); *C04B 41/5346* (2013.01); *C04B 41/72* (2013.01); *E04C 2/06* (2013.01); *E04D 1/16* (2013.01); *E04F 13/14* (2013.01)

(56) References Cited

U.S. PATENT DOCUMENTS

| | | | |
|---|---|---|---|
| 5,107,629 A | | 4/1992 | Boyd et al. |
| 6,872,246 B2 * | | 3/2005 | Merkley ................. C04B 18/24 |
| | | | 106/674 |

FOREIGN PATENT DOCUMENTS

| | | | | |
|---|---|---|---|---|
| DE | 327 004 C | | 10/1920 | |
| DE | 35 46 363 A1 | | 7/1987 | |
| DE | 3546363 A1 | * | 7/1987 | ........... B28B 11/245 |
| DE | 10 2008 020544 A1 | | 12/2009 | |
| DE | 102008020544 A1 | * | 12/2009 | ........... B28B 11/001 |
| WO | 2009/021253 A1 | | 2/2009 | |

OTHER PUBLICATIONS

Ikai, Asbestos-Free Technology with New High Toughness Polypropylene (PP) Fibers in Air-Cured Hatschek Process, Jul. 17, 2009, Construction and Building Materials, vol. 24, Issue 2, pp. 171-180. (Year: 2009).*

* cited by examiner

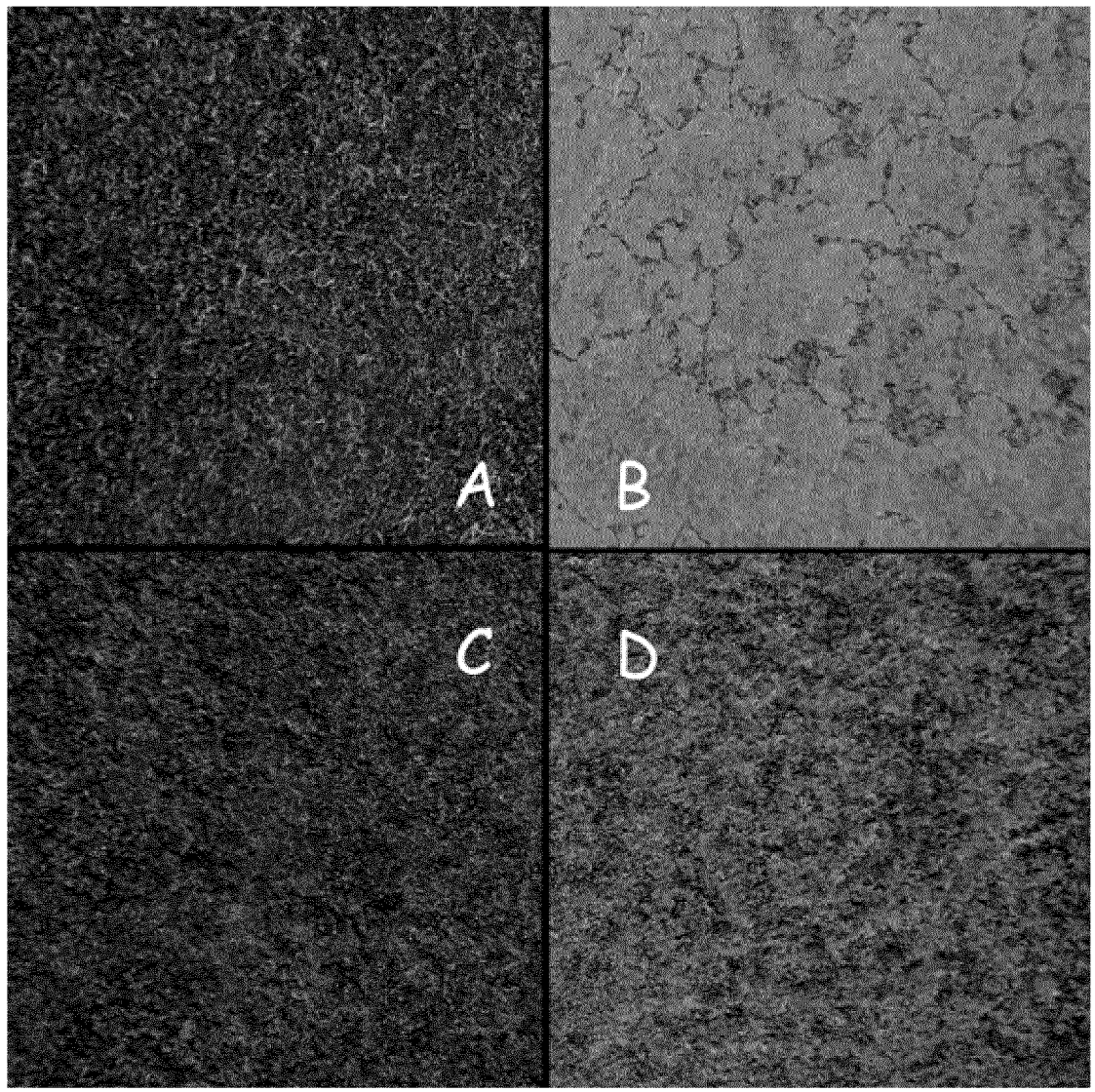

PROCESS FOR PROVIDING A FIBER CEMENT PRODUCT

The present invention relates to the production of fiber cement product, in particular fiber cement sheets or panels, and such fiber cement products such as fiber cement sheets or fiber cement panels.

Fiber cement products, in particular sheets or panels, are well known in the art. They typically comprise cement, fillers, fibers, such as process fibers in case a Hatschek process is used, e.g. cellulose fibers, reinforcing fibers, e.g. polyvinyl alcohol (PVA) fibers, cellulose fibers, polypropylene (PP) fibers and alike, and additives. In case the fiber cement products are air cured, also fillers like limestone can be used. When the fiber cement product is autoclave cured, a silicate source, like sand, is added.

The resulting products are well known as temporary or permanent building materials, e.g. to cover or provide walls or roofs, such as roof tiles, or façade plates and alike.

A disadvantage of such fiber cement products, in particular sheets of plates when used as permanent construction or building materials, is the danger on so-called efflorescence. This is caused by salts which are typically included in the cured fiber cement material. Under appropriate ambient conditions, like humidity, these salts can migrate to the surface of the fiber cement product, where a white spot becomes visible. This phenomena, known as efflorescence, does not decrease or affect the mechanical properties of the fiber cement product, but is seen as a visual defect. It may take a long period, like months, before this efflorescence phenomena becomes visible.

To reduce the risk on this efflorescence, the fiber cement product is usually provided with a hydrophobating coating, rendering the surface of the product more hydrophobic. As such the penetration of water, which seems to be necessary to allow the salts to migrate to the surface, can be reduced.

During an attempt to provide a fiber cement product having a more fluffy, soft, felt-like appearance, an unexpected alternative way to reduce the risk on efflorescence was found.

Surprisingly it was found that fiber cement products whose surface being exposed to ambient conditions, was abrasively blasted, had a significantly reduced efflorescence visible at the surface as compared with non-abrasively blasted surfaces. Even when exposed to severe humid ambient conditions, this efflorescence was less and stayed to a large extent invisible.

This is contrary to the teaching of the prior art, such as WO2009021253, where it was explained that a surface made according to the teaching of WO2009021253, showed efflorescence when in contact with water, such that the application of a coating was necessary to prevent such efflorescence.

This reduction or avoiding of visible efflorescence was even more the case, when a fiber cement product such as a fiber cement sheet or panel, is subjected to an abrasive blasting operation after the humidity of the cured fiber cement sheet has been brought to less than or equal to 8% w by drying. The risk on visual defects due to efflorescence was even more significantly reduced, if not avoided.

The visual effect of the efflorescence may not only be hidden by the rather fluffy outlook of the fiber cement product, but it was noticed that the tendency of salts to migrate to the surface of the fiber cement product, occurred less, or even not at all.

The fiber cement product obtained was provided with a fluffy, soft, felt-like appearance, which cannot be obtained by any other treatment. The use of hydrophobation additives in the fiber cement slurry, the use of a hydrophobation coating or agent on the surface of the cured fiber cement sheet, or the provision of a translucent of clear coating, all known methods to reduce of avoid efflorescence, may be avoided.

According a first aspect of the present invention a process for providing a fiber cement product is provided, the process comprising the steps of
  Providing an uncured fiber cement product;
  Curing the uncured fiber cement product;
  Drying the cured fiber cement product to obtain a humidity of the cured fiber cement product being less than or equal to about 8% w;
  Abrasive blasting at least part of the surface of the dried fiber cement product.

It was found by the present inventors that the crux of the methods of the present invention lie in the combination of the step of drying the fiber cement products to a humidity of at least below about 8% followed by the step of (at least partially) abrasively blasting the fiber cement products. Indeed, the inventors found that this combination of steps is essential to achieve the effect of preventing any visible defects to the products caused by efflorescence. Experimental evidence has shown that when only applying the step of abrasive blasting the fiber cement products, without drying them first, the effect is less pronounced (i.e. visible defects were reduced to a certain extent but could not be entirely prevented).

While the prior art already disclosed methods for abrasively blasting cement or concrete products for the removal of already present efflorescence defects, the problem of reducing or preventing (later occurring) visible defects caused by efflorescence was never addressed before, let alone solved by combining a drying step to a humidity of below about 8% with an abrasive blasting step.

In particular embodiments of the methods of the present invention, the step of drying the fiber cement product is performed until a humidity of below about 7% w of the fiber cement product is achieved. In further particular embodiments of the methods of the present invention, the step of drying the fiber cement product is performed until a humidity of below about 6% w of the fiber cement product is achieved. In yet further particular embodiments of the methods of the present invention, the step of drying the fiber cement product is performed until a humidity of below about 6% w of the fiber cement product is achieved. In yet further particular embodiments of the methods of the present invention, the step of drying the fiber cement product is performed until a humidity of between about 4% w and about 6% w of the fiber cement product is achieved, such as a humidity of between about 4% w and about 5% w, such as a humidity of about 4% w, about 5% w or about 6% w is achieved.

Abrasive blasting in the context of the present invention is the abrasion of a surface by forcibly propelling a stream of abrasive material or a stream of abrasive particles against the surface to be treated under high pressure. Such abrasive particles may be mineral particles (e.g. but not limited to sand, garnet, magnesium sulphate, kieserite, . . . ), natural or organic particles (such as but not limited to crushed nut shells or fruit kernels, . . . ), synthetic particles (such as but not limited to corn starch or wheat starch and alike, sodium bicarbonate, dry ice and alike, copper slag, nickel slag, or coal slag, aluminum oxide or corundum, silicon carbide or carborundum, glass beads, ceramic shot/grit, plastic abrasive, glass grit, and alike) metal grit (such as but not limited to steel shot, steel grit, stainless steel shot, stainless steel grit, corundum shot, corundum grit, cut wire, copper shot, aluminum shot, zinc shot) and any combination of these.

In particular embodiments, the abrasive material is stainless steel grit, such as but not limited to GRITTAL® Rust-proof High-Chromium-Cast-Iron-Grit. In these embodiments, the GRITTAL® Rust-proof High-Chromium-Cast-Iron-Grit particles have a length ranging from about 0.09 mm to about 3.5 mm.

In further particular embodiments, the abrasive material is stainless steel grit having a microstructure comprising martensitic stainless steel, optionally with chromium carbides. In these embodiments, the martensitic stainless steel particles have a length ranging from about 0.09 mm to about 3.5 mm.

In particular embodiments, the abrasive material are stainless steel shot particles having a diameter ranging from about 0.09 mm to about 3.5 mm.

In other particular embodiments, the abrasive material is CHRONITAL® stainless steel shot. In these embodiments, the CHRONITAL® stainless steel shot particles have a length ranging from about 0.09 mm to about 3.5 mm.

According to other particular embodiments of the invention, the abrasive blasting is abrasive shotblasting performed by using for example a shot blasting wheels turbine, which propels a stream of high velocity particles, such as metal particles, against the surface to be treated using centrifugal force.

In further particular embodiments, the abrasive blasting is abrasive shotblasting performed using a Turbostrahler® Shotblasting wheels turbine (Konrad Rump, Oberflächentechnik GMBH & Co, Salzkotten, Germany).

In still further particular embodiments, the abrasive blasting is abrasive shotblasting performed using a Turbostrahler® Shotblasting wheels turbine type R320 (Konrad Rump, Oberflächentechnik GMBH & Co, Salzkotten, Germany)

According to certain particular embodiments of the invention, the abrasive blasting is sand blasting performed by using a sand blaster machinery, which propels a stream of high velocity sand sized particles against the surface to be treated using gas under pressure.

In further particular embodiments, the abrasive blasting is sand blasting and the sand sized particles are particles comprising sand.

In still further particular embodiments, the abrasive blasting is sand blasting and the gas under pressure is compressed air.

According to some embodiments of the invention, the product may be a fiber cement sheet.

A sheet, also referred to as panel or plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

According to some embodiments of the invention, the surfaces with the largest surface area of the sheet may be abrasive blasted.

According to some embodiments of the invention, the product may be abrasive blasted using metal grit, corundum, carborundum or combination of both.

More preferred, the metal grit is steel grit, most preferred stainless steel grit such as austenitic stainless steel grit, e.g. a Chromium-Nickel alloy stainless steel grit, or martensitic stainless steel grit comprising a Chromium-Nickel stainless steel alloy which comprises Chromium carbides.

Preferred is the use of a mixture of metal grit and corundum.

In case of metal grit, this grit may comprise, even consist, of spherical metal particles, or may be crushed metal objects having a rough surface and dimensional structure.

The curing step of the green fiber cement sheet is preferably air curing, though also autoclave curing may be used.

According to some embodiments of the invention, the fiber cement product may be an air cured fiber cement product.

According to some embodiments of the invention, the uncured fiber cement product may be obtained using a Hatschek process.

Fiber cement products are well known in the art. In the context of this invention, fiber cement products are to be understood as cementitious products comprising cement and synthetic or natural, organic fibers. The fiber cement products are made out of fiber cement slurry, which is formed in a so-called green fiber cement product, and cured.

Dependent to some extent on the curing process used, the fiber cement slurry typically comprises water, process or reinforcing fibers which both may be natural organic fibers (typically cellulose fibers) or synthetic organic fibers (polyvinylalcohol, polyacrilonitrile, polypropylene, polyamide, polyester, polycarbonate, polyethylene, etc.), cement e.g. Portland cement, limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, anti-foaming agents, flocculants, and other additives. Optionally a color additive (e.g. pigments) are added, to obtain a fiber cement product which is so-called colored in the mass.

The green fiber cement product is cured, typically by curing to the air (air cured fiber cement products) or under pressure in presence of steam and increased temperature (autoclave cured). For autoclave cured products, typically sand is added in the fiber cement slurry. The autoclave curing typically results in the presence of 11.3 Å (angstrom) Tobermorite in the fiber cement product.

Fiber cement products, such as fiber cement plates or fiber cement sheets or fiber cement panels usually are made using the well-known Hatschek-process, flow-on process or Magnani-process or combinations thereof.

The fiber cement product being a panel, sheet or plate, may be obtained by first providing a green fiber cement product being a panel, sheet or plate, which is subjected to compression, before curing, i.e. by air curing or autoclave curing.

The "green" fiber cement board, after being made by the Hatschek-process, may be first pre-cured to the air, after which the pre cured board is further air cured until it has its final strength, or autoclave cured using pressure and steam, to give the board its final properties.

After curing, the fiber cement product being a panel, sheet or plate, may still comprise a significant weight of water, present as humidity. This may be up to 10 even 15% w, expressed per weight of the dry product. The weight of dry product is defined as the weight of the product when the product is subjected to drying at a temperature between about 70° C. and 105° C. in a ventilated furnace, until a constant weight is obtained.

Before subjecting the product to abrasive blasting, the fiber cement product is dried. Such drying is done preferably by air drying and is terminated when the % w of humidity of the fiber cement product is less than or equal to about 8% w, even less than or equal to about 6% w, expressed per weight of dry product, and most preferably between about 4% w and about 6% w, inclusive.

In particular embodiments of the methods of the present invention, the step of drying the fiber cement product is performed until a humidity of below about or equal to 7% w of the fiber cement product is achieved. In further particular embodiments of the methods of the present invention, the step of drying the fiber cement product is performed until a humidity of below about or equal to 6% w of the fiber cement product is achieved. In yet further particular embodiments of the methods of the present invention, the step of drying the fiber cement product is performed until a humidity of between about 4% w and about 8% w of the fiber cement product is achieved, such as a humidity of between about 4% w and about 7% w, such as a humidity of between about 4% w and about 6% w, such as a humidity of between about 4% w and about 5% w, such as a humidity of about 4% w, or a humidity of about 5% w is achieved.

In case of a fiber cement product being a panel, sheet or plate, at least one of the main surfaces is subjected to abrasive blasting, but optionally both of its surfaces may be abrasively blasted.

Preferably the fiber cement product is a fiber cement sheet. The density of the sheets may vary from about 0.5 kg/dm$^3$ to about 2.2 kg/dm$^3$, such as from about 0.6 kg/dm$^3$ to about 2.0 kg/dm$^3$. More preferred, the sheets have a density of more than or equal to about 1.7 kg/dm$^3$.

The fiber cement panels or sheets or plates may preferably have a thickness up to 45 mm. Typical properties are thicknesses of the sheet, which may vary from 4 mm to 20 mm, such as from about 7.0 mm to about 13.0 mm The fiber cement product being a panel, sheet or plate according to the invention may have a height typically up to 4 m and a width typically up to about 1.5 m. The height of the fiber cement product being a panel, sheet or plate may preferably be in the range of about 1.5 m to about 4 m, most preferred in the range of about 2 m to about 4 m, e.g. in the range of about 2.5 m to about 3.7 m, e.g. about 2.5 m, about 2.6 m, about 2.7 m, about 2.8 m, about 2.9 m, about 3.0 m, about 3.1 m, about 3.2 m, about 3.3 m, about 3.4 m, about 3.5 m, about 3.6 m and about 3.7 m. The width of the fiber cement product being a panel, sheet or plate may preferably be in the range of about 0.6 m to about 1.75 m, most preferred in the range of about 0.6 m to about 1.5 m, e.g. in the range of about 0.75 m to about 1.5 m, e.g. about 1.0 m, about 1.1 m, about 1.2 m, about 1.3 m, about 1.4 m or about 1.5 m.

Preferably the fiber cement product is a fiber cement plate or sheet, having two substantially flat surfaces.

Due to the abrasive blasting, the blasted surface or surfaces show unevenness's.

Optionally, the abrasive blasted surface may be treated with a hydrophobation agent, to further increase the hydrophobicity of the surface According to a second aspect of the present invention, a fiber cement product is provided, the product being obtained using a process according to the first aspect of the present invention Such fiber cement product, preferably a sheet or panel, can be used in particular as a temporary or permanent building construction element, e.g. for providing and/or covering of walls, typically outside walls and roofs, e.g. as tiles or slates. The fiber cement product obtained is provided with a fluffy, soft, felt-like appearance, which has not been obtained by any other treatment.

According to a third aspect of the present invention, a fiber cement product having at least one at least partially abrasive blasted cementitious surface is used as covering of a building construction.

According to some embodiments, a fiber cement product obtained using a process according to the first aspect of the present invention, and/or the fiber cement product according to the second aspect of the invention, can be used as covering of a building construction.

The at least partially abrasive blasted cementitious surface is not coated with any material. As such the partially abrasive blasted surface is cementitious, as some cementitious material is present at the outer side of the surface.

This at least partially abrasive blasted cementitious surface provides a face of the building construction, subjected to ambient conditions, preferably outdoor ambient conditions.

The above and other characteristics, features and advantages of the present invention will become apparent from the following detailed description which illustrate, by way of example, the principles of the invention. This description is given for the sake of example only, without limiting the scope of the invention.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention.

It is to be understood that the value to which the modifier "about" refers is itself also specifically, and preferably, disclosed.

When reference in this document is made to water content or humidity of a product, expressed as % w, this FIGURE refers to the weight difference, expressed as percentage over the dry weight, said difference being the difference between the weight of the product as sampled, and the weight of the dry product being defined as the weight of the product when the product is subjected to drying at a temperature between about 70° C. and about 105° C. in a ventilated furnace, until a constant weight is obtained.

BRIEF DESCRIPTION OF THE DRAWINGS

FIG. 1 shows a sheet according to the present invention, before and after being subjected to a so-called condensation test, and a comparative sheet according to prior art, before and after being subjected to a so-called condensation test.

DESCRIPTION OF ILLUSTRATIVE EMBODIMENTS

In a first embodiment, a fiber cement sheet, plate or panel is described which is obtained by means of a Hatschek process.

A fiber cement slurry is provided, which comprises next to water
  Cement (type Portland cement) in an amount of about 80 to 90% w;
  Cellulose fibers in an amount of about 1.5 to 5% w;
  Synthetic fibers (such as e.g. PVA, PE, PP and alike) in an amount of about 1.5 to 5% w;
  Further additives such as pigments, anti-foaming agents, flocculants, fillers, reactive fillers comprising silica sources and other additives.

The % w are expressed as percentage of the component over the dry weight of the slurry, i.e. the weight of all components without water.

This slurry is transformed in to a green fiber cement sheet by means of a Hatschek process.

This green sheet is subjected to a pressing step, compressing it to a thickness of about 8 mm and having an density of about 1.75 kg/m³. The dimension of the green sheet is about 3.1 m by about 1.3 m.

In an alternative, a green sheet with similar dimensions and density is made, having a thickness of about 12 mm.

In general, green sheets with a density between about 1.5 and about 1.8 kg/m³ can be provided, with a thickness between about 7 mm and about 13 mm.

The green sheets are air cured by allowing the cement to cure under ambient conditions for about 3 weeks.

After air curing, the sheets have a water content (or humidity) of about 10% w. using a ventilated furnace, the sheets are dried to a humidity between 4 and 6% w at increased temperature (typically higher than 70° C. and lower than 105° C.).

The cured and dried product is subjected to an abrasive blasting operation at one of the main surfaces. The abrasive blasting operation used a martensitic stainless steel crushed grit of type "Grittal GM" (obtainable form the company Vulkan in Ontario Calif.). The sheets were held inclined to the vertical to allow the abrasive material to be removed from the surface by gravity. The abrasive blasting used in the present example may be performed by sandblasting or abrasive shotblasting. In the case of sandblasting, sand-sized particles, such as but not limited to sand particles are used.

Such abrasive blasted fiber cement sheets, without a post treatment, were subjected to a durability test by exposing the sheets outside to climatological elements in Europe, i.e. rain, wind, sunlight, frost, etc, during several months, including a winter. No visible defects due to efflorescence could be noticed.

This very same product was subjected to a condensation test, simulating severe weather conditions of humidity. The sample sheet of 19 by 7 cm is mount on a holder (holding the sample at its edges) and held above a demin-water bath at 60° C. for 16 h, the abrasion blasted surface oriented towards the water and on a distance of 25 cm of this water surface. This equipment is positioned in a closed cabinet, such that the water vapor cannot escape to the ambient. After 16 h, the sheet is dried to ambient conditions.

In FIG. 1, an abrasion blasted surface before and after this condensation test is shown. Sample C in FIG. 1 is abrasion blasted surface before the test and sample D is this very same sample after this condensation test.

Some whitening of the surface appearance is visible. This minor change in color is likely due to efflorescence, however no hindering efflorescence effect is noticed.

In FIG. 1, a reference, untreated surface before and after this condensation test is shown. Sample A in FIG. 1 is the reference surface before the test and sample B is this very same sample after this condensation test.

A severely whitened surface in sample B is visible, the whitening being broken into islands. This whitening is due to efflorescence of the surface.

It is to be understood that although preferred embodiments and/or materials have been discussed for providing embodiments according to the present invention, various modifications or changes may be made without departing from the scope and spirit of this invention.

The invention claimed is:

1. A process for providing a fiber cement product which is free of any visible effects of efflorescence, comprising a combination of the following steps in the following order:
  providing an uncured fiber cement product consisting essentially of fiber and cement;
  air curing said uncured fiber cement product under ambient conditions;
  air drying said cured fiber cement product after completion of curing, in a separate step and in a ventilated furnace at a temperature between about 70° C. and 105° C., to obtain a humidity of said cured fiber cement product being less than or equal to about 8% w; and
  upon completion of said air drying, directly abrasive blasting at least part of the surface of said dried fiber cement product,
  wherein said uncured fiber cement product is obtained using a Hatschek process and the abrasive blasting excludes sandblasting.

2. A process according to claim 1, wherein said product is a fiber cement sheet.

3. A process according to claim 2, wherein the largest surface area of said sheet is abrasive blasted.

4. A process according to claim 1, wherein said product is abrasive blasted using metal grit, corundum, carborundum or combinations thereof.

5. The process according to claim 1, comprising the step of using the fiber cement product as covering of a building construction.

6. A process according to claim 1, wherein the abrasive blasting is shotblasting.

7. A process according to claim 6, wherein the abrasive shotblasting is carried out with metal particles.

8. A process according to claim 6, wherein the abrasive shotblasting is carried out with a turbine propelling a high velocity stream of particles against the cement surface.

9. A process for providing a fiber cement product which is free of any visible effects of efflorescence, comprising a combination of the following steps in the following order:
provisioning a fiber cement slurry comprising about 80 to 90% by weight cement, 1.5 to 5% by weight cellulose fibers and 1.5 to 5% by weight synthetic fibers;
transforming the slurry into a green fiber cement sheet by a Hatschek process, prior to air curing;
air curing said green fiber cement sheet under ambient conditions;
air drying said cured fiber cement sheet after completion of curing, in a separate step and in a ventilated furnace at a temperature between about 70° C. and 105° C., to obtain a humidity of said cured fiber cement sheet being less than or equal to about 8% w; and
upon completion of said air drying, directly abrasive blasting at least part of the surface of said dried fiber cement sheet,
wherein the abrasive blasting excludes sandblasting.

10. A process according to claim 9, wherein the sheet is air cured for about 3 weeks.

* * * * *